(12) United States Patent
Kurabayashi

(10) Patent No.: US 12,468,962 B2
(45) Date of Patent: Nov. 11, 2025

(54) ELECTRONIC DEVICE, METHOD, PROGRAM, AND SYSTEM FOR IDENTIFIER-INFORMATION INFERENCE USING IMAGE RECOGNITION MODEL

(71) Applicant: CYGAMES, INC., Tokyo (JP)

(72) Inventor: Shuichi Kurabayashi, Tokyo (JP)

(73) Assignee: CYGAMES, INC., Tokyo (JP)

( * ) Notice: Subject to any disclaimer, the term of this patent is extended or adjusted under 35 U.S.C. 154(b) by 937 days.

(21) Appl. No.: 17/651,495

(22) Filed: Feb. 17, 2022

(65) Prior Publication Data

US 2022/0172082 A1    Jun. 2, 2022

Related U.S. Application Data

(63) Continuation of application No. PCT/JP2020/030998, filed on Aug. 17, 2020.

(30) Foreign Application Priority Data

Aug. 20, 2019    (JP) ................. 2019-150334

(51) Int. Cl.
  *G06N 3/04*    (2023.01)
  *G06N 3/045*   (2023.01)
  *G06N 5/04*    (2023.01)

(52) U.S. Cl.
  CPC ............. *G06N 5/04* (2013.01); *G06N 3/045* (2023.01)

(58) Field of Classification Search
  CPC .................. G06N 3/045; G06N 5/04
  See application file for complete search history.

(56) References Cited

U.S. PATENT DOCUMENTS 11,095,943 B1 *   8/2021   Kissig ............ G06N 3/02
2015/0022444 A1   1/2015   Ooi
(Continued)

FOREIGN PATENT DOCUMENTS

CN    107728895 A    2/2018
JP    2013161267 A   8/2013
(Continued)

OTHER PUBLICATIONS

Zhao, Yu, et al. "Automatically learning user preferences for personalized service composition." 2017 IEEE International Conference on Web Services (ICWS). IEEE, 2017. (Year: 2017).*
(Continued)

*Primary Examiner* — Hal Schnee
(74) *Attorney, Agent, or Firm* — Osha Bergman Watanabe & Burton LLP

(57) ABSTRACT

Provided is an electronic device including: a storage unit for storing a plurality of image recognition models each of which is defined by an item of learning content unique thereto, with each of which at least one item of identifier information can be inferred by using the item of learning content, and each of which is linked with an item of attribute information unique thereto; a destination-attribute-information identifying unit that identifies at least one item of attribute information as a destination of image information from among items of attribute information stored in the storage unit, on the basis of an operation; an image-recognition-model selecting unit that selects the image recognition model linked with the identified item of attribute information; and an identifier-information inferring unit that inputs the image information to the image recognition model selected by the image-recognition-model selecting unit and that infers an item of identifier information.

9 Claims, 9 Drawing Sheets

(56) References Cited

U.S. PATENT DOCUMENTS

| | | | |
|---|---|---|---|
| 2018/0276500 A1 | 9/2018 | Yamada et al. | |
| 2018/0318719 A1 | 11/2018 | Ma et al. | |
| 2018/0342084 A1 | 11/2018 | Yonetsuji | |
| 2019/0147360 A1 | 5/2019 | Matsumoto et al. | |
| 2020/0368616 A1* | 11/2020 | Delamont | H04N 13/239 |
| 2021/0241503 A1 | 8/2021 | Yonetsuji | |

FOREIGN PATENT DOCUMENTS

| | | | |
|---|---|---|---|
| JP | 2018073070 A | 5/2018 | |
| JP | 2018163554 A | 10/2018 | |
| JP | 2018197948 A | 12/2018 | |
| JP | 2019063001 A | 4/2019 | |
| JP | 2019097978 A | 6/2019 | |
| WO | 2018142765 A1 | 8/2018 | |

OTHER PUBLICATIONS

Horiguchi, Shota, et al. "Personalized classifier for food image recognition." IEEE Transactions on Multimedia 20.10 (2018): 2836-2848. (Year: 2018).*

Bálint, Zsolt, et al. "Augmented reality and image recognition based framework for treasure hunt games." 2012 IEEE 10th Jubilee International Symposium on Intelligent Systems and Informatics. IEEE, 2012. (Year: 2012).*

Super special topic: the main staff shall exhaust the birth to the completion of "Toki Memo 2", Making of "Toki Memo 2", Electric shock Playstation D Konami FanBook, Japan, MediaWorks, Jan. 7, 2000, vol. 5, No. 35, vol. 124, p. 8-23 (20 pages).

Ryuga gotoku complete walk-through, Enterbrain Inc., Feb. 5, 2007, First edition, pp. 286 to 327 (45 pages).

LovePlus LovePlus, Electric shock games, vol. 3, ASCII Media Works, Jan. 1, 2010, No. 10, p. 80-90 (14 pages).

Notice of Reasons for Refusal Issued in Japanese Patent Application No. 2019-150334, dispatched on Feb. 17, 2020 (8 pages).

Decision of Refusal issued in Japanese Patent Application No. 2019-150334, dispatched on Sep. 1, 2020 (6 pages).

International Search Report issued in International Application No. PCT/JP2020/030998, mailed Oct. 27, 2020 (5 pages).

Written Opinion issued in International Application No. PCT/JP2020/030998; Dated Oct. 27, 2020 (4 pages).

* cited by examiner

ELECTRONIC DEVICE, METHOD, PROGRAM, AND SYSTEM FOR IDENTIFIER-INFORMATION INFERENCE USING IMAGE RECOGNITION MODEL

TECHNICAL FIELD

The present invention relates to an electronic device, a method, a program, and a system for identifier-information inference using an image recognition model.

BACKGROUND ART

With the development of information networks in recent years, it is common to share information between friends by using chat applications, SNS applications, etc. on smartphones. The content to be sent to another user for such information sharing can include not only a text message but also an image such as a picture, screenshot, or the like taken by a user (Patent Literature 1). The other user who has received the message, image, etc., replies thereto with an impression message etc., whereby the users can enjoy communication with each other.

CITATION LIST

Patent Literature

{Patent Literature 1} Japanese Unexamined Patent Application,
Publication No. 2018-073070

SUMMARY OF INVENTION

Technical Problem

Applications such as those for games executed on smartphones are also generally used. The relationship between an existing SNS or communication application for information sharing and an application for a game etc. remains the relationship in an outbound direction from the game etc. to the SNS, specifically, the relationship in which information in the game etc. is output externally, such as the relationship in which a screenshot in the game etc. is shared with another user by using another application. An inbound-direction mechanism, in which an image obtained via an SNS or an image acquired by a camera is sent to attribute information of a character etc. in an application, has not been realized.

Solution to Problem

The present invention has been made in view of the above-described problem and has the following features. Specifically, according to one embodiment, the present invention provides an electronic device including: an operation accepting unit that can accept an operation from a user; a storage unit for storing a plurality of image recognition models each of which is defined by an item of learning content unique thereto, with each of which at least one item of identifier information can be inferred by using the item of learning content, and each of which is linked with an item of attribute information unique thereto; a destination-attribute-information identifying unit that identifies at least one item of attribute information as a destination of image information from among items of attribute information stored in the storage unit, on the basis of an operation accepted by the operation accepting unit; an image-recognition-model selecting unit that selects, from among the plurality of image recognition models stored in the storage unit, the image recognition model linked with the item of attribute information identified by the destination-attribute-information identifying unit; and an identifier-information inferring unit that inputs the image information to the image recognition model selected by the image-recognition-model selecting unit and that infers an item of identifier information from the image information on the basis of the item of learning content.

Furthermore, items of learning content, which define the plurality of image recognition models stored in the storage unit, can each be defined by an item of teacher data unique to the corresponding image recognition model, and the item of unique teacher data can be defined by a set of pairs of items of image information and labels serving as items of identification information.

Furthermore, the storage unit may store a plurality of items of response content respectively corresponding to a plurality of items of identifier information, so as to link the items of response content with the plurality of image recognition models, and it is also possible to include a response-content executing unit that identifies, on the basis of the item of identifier information inferred by the identifier-information inferring unit, an item of response content corresponding to the item of identifier information from among the plurality of items of response content stored in the storage unit and that executes the item of response content.

A display unit that displays information to the user may be further included, the storage unit may store at least one of text information and icon image information that correspond to each of the items of attribute information, and the destination-attribute-information identifying unit may display, on the display unit, said at least one of the text information and the icon image information stored in the storage unit, and may identify at least one item of attribute information as the destination of the image information from among the items of attribute information stored in the storage unit, when the user specifies the displayed at least one of the text information and the icon image information by means of the operation accepting unit.

According to one embodiment, the present invention provides a method executed by at least one computer and causing the computer to execute: a storing step for storing a plurality of image recognition models each of which is defined by an item of learning content unique thereto, with each of which at least one item of identifier information can be inferred by using the item of learning content, and each of which is linked with an item of attribute information unique thereto; an operation accepting step for accepting an operation from a user; a destination-attribute-information identifying step for identifying at least one item of attribute information as a destination of image information from among the stored items of attribute information, on the basis of the operation accepted in the operation accepting step; an image-recognition-model selecting step for selecting, from among the plurality of stored image recognition models, the image recognition model linked with the item of attribute information identified in the destination-attribute-information identifying step; and an identifier-information inferring step for inputting the image information to the image recognition model selected in the image-recognition-model selecting step and for inferring an item of identifier information from the image information on the basis of the item of learning content.

Said at least one computer may be a user terminal.

Said at least one computer can include a user terminal and a server.

According to one embodiment, the present invention provides a program that can cause at least one computer to execute the above-described method.

According to one embodiment, the present invention provides a system that includes a user terminal and a server, the user terminal including: an operation accepting unit that can accept an operation from a user; and a destination-attribute-information identifying unit that identifies at least one item of attribute information as a destination of image information on the basis of an operation accepted by the operation accepting unit, and the server including: a storage unit for storing a plurality of image recognition models each of which is defined by an item of learning content unique thereto, with each of which at least one item of identifier information can be inferred by using the item of learning content, and each of which is linked with an item of attribute information unique thereto; an image-recognition-model selecting unit that selects, from among the plurality of image recognition models stored in the storage unit, the image recognition model linked with the item of attribute information identified by the destination-attribute-information identifying unit; and an identifier-information inferring unit that inputs the image information to the image recognition model selected by the image-recognition-model selecting unit and that infers an item of identifier information from the image information on the basis of the item of learning content.

Advantageous Effects of Invention

According to the present invention, a configuration is adopted in which items of attribute information and image recognition models are linked with each other, and, when an item of attribute information serving as a destination is selected, the image recognition model linked with the item of attribute information is selected and is used for image recognition; thus, even in the case where a large number of items of image content are recognized for a large number of items of attribute information, it is possible to recognize a target item of image content through inference processing using the image recognition models learned for the individual items of attribute information, to realize high inference performance even in the case where a small amount of data is used, and to realize high response performance by implementing the individual image recognition models as relatively small neural networks.

DESCRIPTION OF EMBODIMENTS

A system 1 according to an embodiment of the present invention will be described below with reference to the accompanying drawings. In this description, for convenience of description, there are cases where descriptions that are more detailed than necessary are omitted. For example, there are cases where detailed descriptions of matters that are already well known and repeated descriptions of substantially the same configurations are omitted.

First Embodiment

Figure 1:
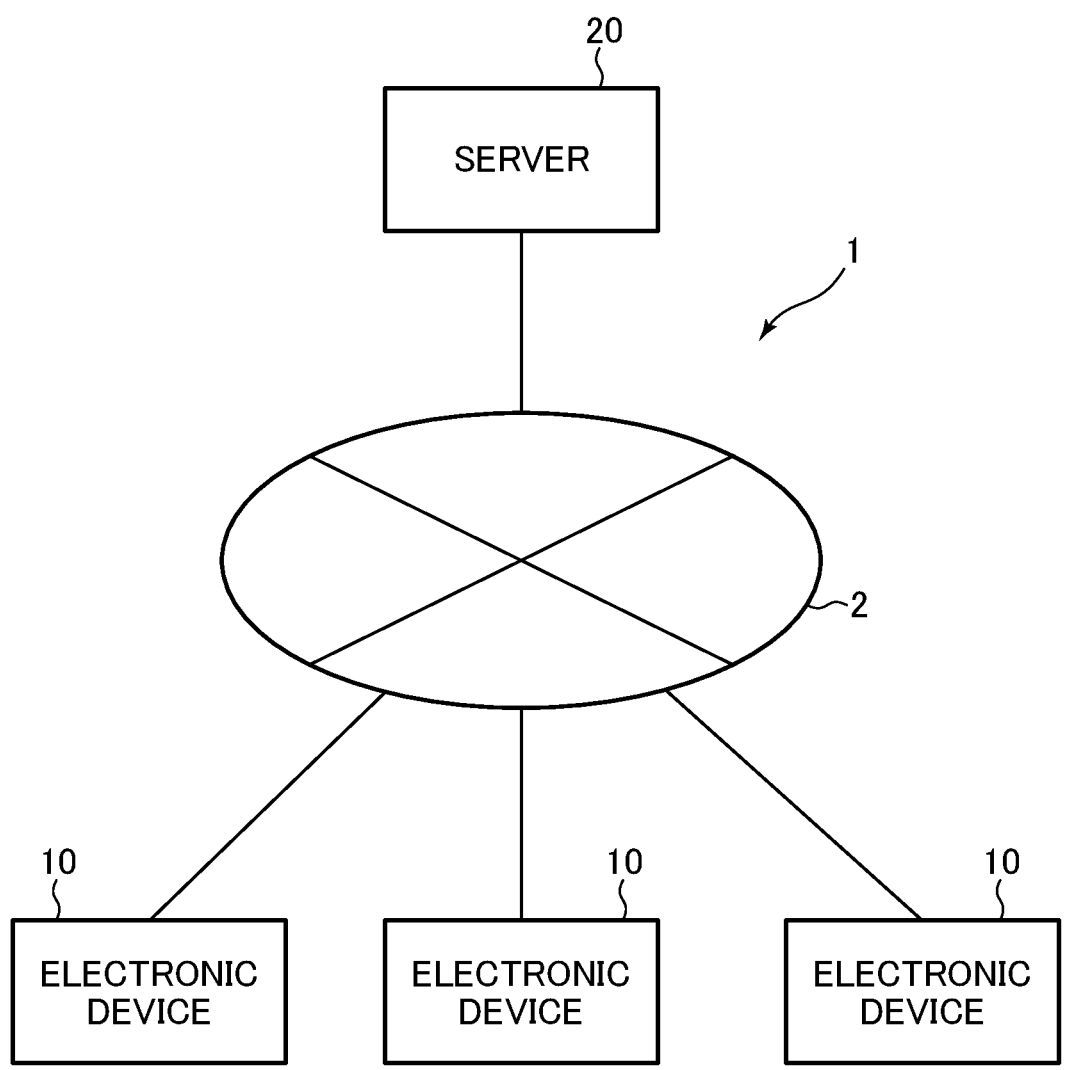
FIG. 1 is a configuration diagram of a system according to one embodiment of the present invention.

FIG. 1 shows an example of the overall configuration of the system 1 according to the embodiment of the present invention. As shown in FIG. 1, the system 1 includes a plurality of electronic devices 10 serving as user terminals and a server 20. The electronic devices 10 and the server 20 are connected to a network 2 such as the Internet, thus being allowed to communicate with each other.

Figure 2:
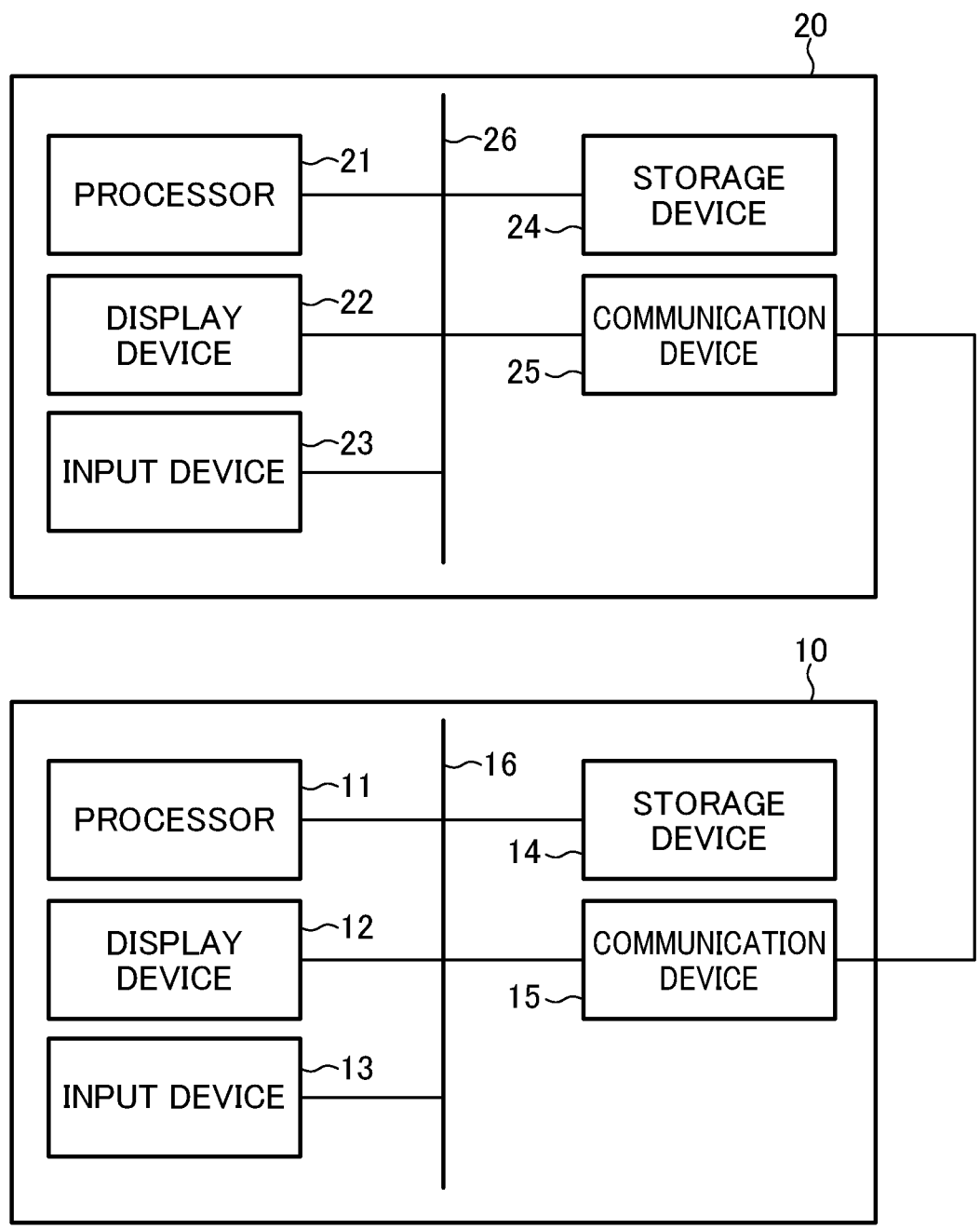
FIG. 2 is a hardware configuration diagram of a server and an electronic device according to the embodiment of the present invention.

FIG. 2 is a block diagram showing the hardware configurations of each of the electronic devices 10 and the server 20 according to the embodiment of the present invention. The electronic device 10 includes a processor 11, a display device 12, an input device 13, a storage device 14, and a communication device 15. These individual constituent devices are connected via a bus 16. Note that interfaces are interposed as needed between the bus 16 and the individual constituent devices. In this embodiment, the electronic device 10 is a smartphone. Alternatively, the electronic device 10 may be a terminal such as a computer equipped with a contact-type input device, like a tablet computer or a touchpad, as long as the terminal includes the configuration described above.

Similarly, the server 20 includes a processor 21, a display device 22, an input device 23, a storage device 24, and a communication device 25. These individual constituent devices are connected via a bus 26. Note that interfaces are interposed as needed between the bus 26 and the individual constituent devices. In this embodiment, the server 20 is realized by a computer.

The processors 11 and 21 control the overall operations at the electronic device 10 and the server 20, respectively, and are, for example, CPUs. Note that electronic circuits such as MPUs may also be used as the processors 11 and 21. The processors 11 and 21 execute various kinds of processing by loading and executing programs and data stored in the storage devices 14 and 24, respectively.

The display devices (displays) 12 and 22 display application screens etc. to a user of the electronic device 10 and a user of the server 20 according to control of the processors 11 and 21, respectively. The display devices 12 and 22 are preferably liquid crystal displays or may be displays using organic EL, plasma displays, or the like.

The input devices 13 and 23 are user interfaces for accepting inputs from the users to the electronic device 10 and the server 20, and are, for example, touchscreens, touchpads, keyboards, or mouses. In this embodiment, since the electronic device 10 is a smartphone, the electronic device 10 includes a touchscreen as the input device 13, and the touchscreen also functions as the display device 12, whereby the display device 12 and the input device 13 have an integrated structure. The display device 12 and the input device 13 may have separate forms disposed at different positions. Since the server 20 is a computer, it is assumed that the server 20 includes a keyboard and a mouse as the input device and includes a liquid crystal display as the display device.

The storage devices 14 and 24 are storage devices included in general smartphones and computers, such as magnetic storage devices and storage devices that use RAMS, which are volatile memories, and flash memories, which are non-volatile memories, such as eMMCs, UFSs, or SSDs. The storage devices 14 and 24 may include external memories. For example, the storage device 14 stores an application, and the storage device 24 stores an application for the server. The applications include programs for executing events of the applications and various kinds of data to be referred to when the programs are executed.

The communication devices 15 and 25 can send data to and receive data from other devices via the network 2 (not shown in FIG. 2). For example, the communication devices 15 and 25 perform mobile communication or wireless communication, such as that using a wireless LAN, to connect to the network 2. The electronic device 10 uses the communication device 15 to communicate with the server 20 via the network. The communication devices 15 and 25 may perform wired communication using an Ethernet (registered trademark) cable or the like.

Figure 3:
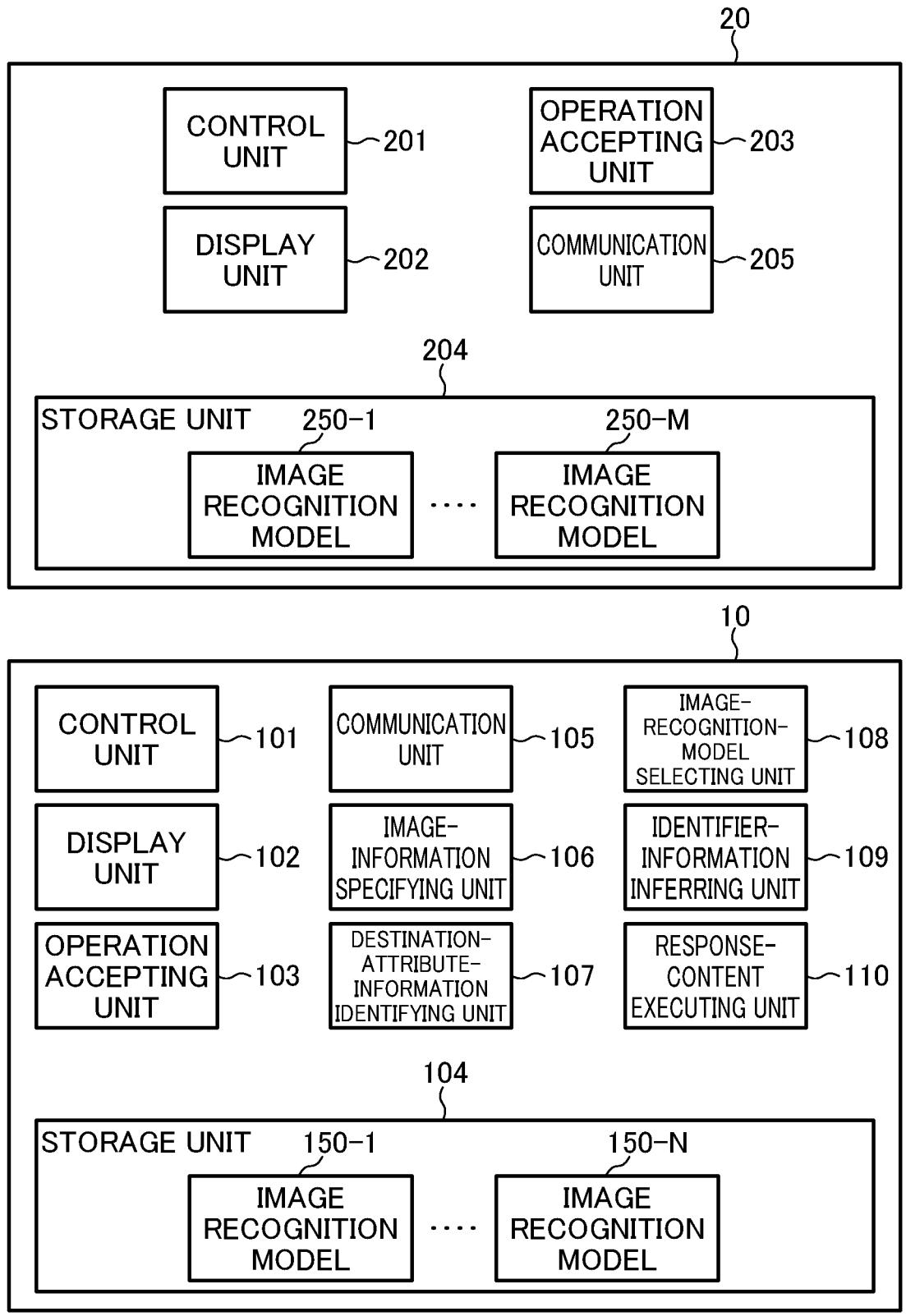
FIG. 3 is a functional block diagram of the server and the electronic device according to the embodiment of the present invention.

FIG. 3 shows examples of functional block diagrams of the electronic device 10 and the server 20 according to the embodiment of the present invention. The electronic device 10 includes a control unit 101, a display unit 102, an operation accepting unit 103, a storage unit 104, a communication unit 105, an image-information specifying unit 106, a destination-attribute-information identifying unit 107, an image-recognition-model selecting unit 108, an identifier-information inferring unit 109, and a response-content executing unit 110. The server 20 includes a control unit 201, a display unit 202, an operation accepting unit 203, a storage unit 204, and a communication unit 205. The storage units 104 and 204 store a plurality of image recognition models 150-1 to 150-N and a plurality of image recognition models 250-1 to 250-M, respectively.

In this embodiment, these functions are realized when the processors 11 and 21 execute programs. For example, the executed programs are programs stored in the storage devices 14 and 24. Since the various kinds of functions are realized by loading the programs, as described above, a portion or the entirety of one part (function) may be included in another part. Alternatively, these functions may be realized by means of hardware by configuring electronic circuits or the like each realizing a portion or the entirety of each of the functions.

The control unit 101 of the electronic device 10 executes control processing when executing functions of the application of this embodiment. The display unit 102 displays application screens for controlling the functions of the application and displays application screens in accordance with the functions of the application and user operations. The operation accepting unit 103 accepts inputs from the user of the electronic device 10. In this embodiment, a touchscreen including the display unit 102 and the operation accepting unit 103 is used, and the operation accepting unit is realized by a touch detection function.

The storage unit 104 stores information needed for information processing executed by the control unit 101. Furthermore, the storage unit 104 stores two or more items of attribute information that can be used by the user. The attribute information is information indicating an attribute serving as the destination of an image, and can be, for example, information identifying a character or a virtual personality in a game application.

In this embodiment, it is assumed that the attribute is set as a character in the game, and the attribute information is set as character identifying information. In the case where the same character has a plurality of variations depending on differences in rarity or differences in costume, it is possible to assign different items of character identifying information thereto as items of attribute information. The storage unit 104 stores, as items of attribute information, character identifiers of characters owned by the user. Furthermore, the storage unit 104 stores the image recognition models 150-1 to 150-N associated with the individual items of attribute information. Here, the image recognition models linked with the character identifiers of N characters owned by the user are stored. Each of the image recognition models is a neural network (NN) model that is defined by an item of learning content unique to the model and with which at least one item of identifier information can be inferred by using the item of learning content.

Identifier information is information indicating an item of image content, and can be designed in advance by a system designer. In this specification, an item of identifier information that serves as an inference result output from an image recognition model using the corresponding item of learning content may be referred to as a class. Identifier information that is used to define teacher data used for defining an item of learning content may be referred to as a label. Furthermore, identifier information that is linked with script data indicating an item of response content to be executed based on the inferred identifier information may also be referred to as a label.

The destination-attribute-information identifying unit 107 identifies, as the destination of image information, at least one item of attribute information from among the items of attribute information stored in the storage unit 104, on the basis of an input operation of the user accepted by the operation accepting unit 103. The image-information specifying unit 106 specifies image information to be sent to the destination, on the basis of the input operation of the user accepted by the operation accepting unit 103. The image information is not limited to image information about a still image and may be image information about a moving image.

The image-recognition-model selecting unit 108 selects the image recognition model linked with the attribute information identified by the destination-attribute-information identifying unit 107, from among the plurality of image recognition models stored in the storage unit 104. The identifier-information inferring unit 109 inputs the image information specified by the image-information specifying unit 106 into the image recognition model 150 selected by the image-recognition-model selecting unit 108 and infers identifier information from the image information on the basis of the learning content. On the basis of the identifier information inferred by the identifier-information inferring unit 109, the response-content executing unit 110 identifies the item of response content corresponding to the identifier information from among a plurality of items of response content stored in the storage unit 104 and executes the item of response content.

The control unit 201 of the server 20 performs processing for the application executed at the electronic device 10. In one example, when the application is executed at the electronic device 10, the control unit 201 sends data thereto and receives data therefrom regularly or as needed, to realize the functions of the application at the electronic device 10. The display unit 202 displays a management screen for a server administrator on the display device 22 as needed.

The storage unit 204 stores information needed for information processing executed by the control unit 201. Furthermore, the storage unit 204 stores all items of attribute information available in the application and stores the image recognition models 250-1 to 250-M associated with the individual items of attribute information. In this embodiment, at the server 20, for M characters that are all characters available in the game application, items of teacher data unique to the individual models are prepared, and the image recognition models 250-1 to 250-M are generated and are stored in the storage unit 204. Then, among the image recognition models, the image recognition models corresponding to the characters owned by the user of the electronic device 10 are sent to the electronic device 10 and are stored in the storage unit 104.

Figure 4:
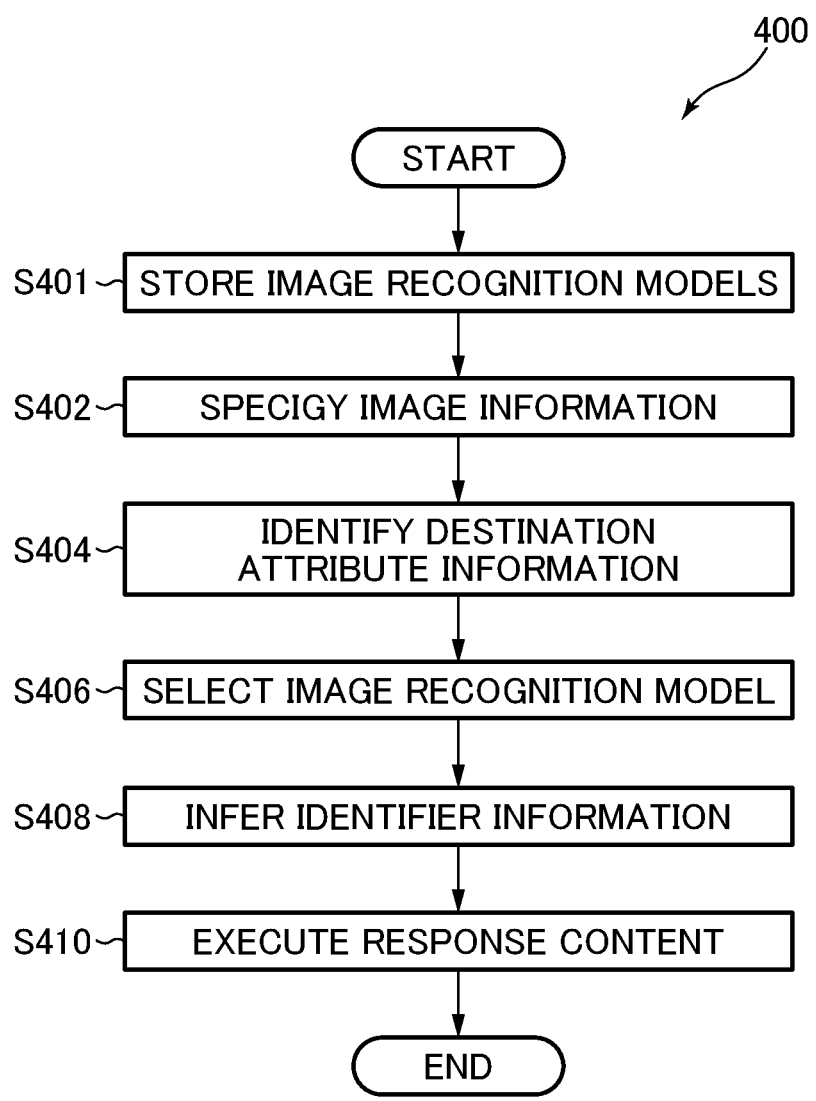
FIG. 4 is a flowchart showing information processing according to the embodiment of the present invention.

Next, an information processing operation 400 of the system of this embodiment will be described below with reference to FIG. 4. In this embodiment, it is assumed that the system is a game system, a smartphone is used as the electronic device 10, a game application is executed, as the application, on the OS for the smartphone at the electronic device 10, and a game application for the server is executed on the OS for the server, at the server 20. In this game, a plurality of characters are prepared as game media, and the user obtains characters through lottery processing, for example. Then, it is assumed that the game is made to proceed by using the plurality of obtained characters. Here, a description will be given of an example case in which the user sends an image acquired outside the game to a character owned by the user, and response processing, which is determined for each character, is executed in accordance with an inferred item of image content of the image. Sending to a character can include another concept for sharing with the character.

In this embodiment, an image recognition model is modeled as a function to which a bitmap image is input as image information and that outputs identifier information, which serves as a class, corresponding to an item of image content thereof, at the time of inference. Here, the item of image content means an arbitrary feature that can be classified by the neural network, such as an object, a background, or a combination of objects captured in the image.

For example, when the item of image content is an apple, which is fruit, this system outputs, as an inference, identifier information (class) and the probability thereof, as in "apple, 90%". Then, as inferred identifier information, it is possible to output only an item of identifier information for the most probable identifier or to output all items of identifier information that exceed a predetermined threshold.

In the information processing operation 400, first, items of learning content unique to the individual characters are prepared, image recognition models are defined by the items of unique learning content and are stored in the storage unit 204 of the server, and the image recognition models that are linked with the characters owned by the user are downloaded at the electronic device 10 and are stored in the storage unit 104 (S401). Accordingly, it is possible to prepare neural network models individualized for the respective characters.

In this embodiment, an item of learning content is defined by an item of teacher data unique to each image recognition model, and the unique item of teacher data is defined by a set of pairs of items of image information and items of identifier information, which serve as labels. An example of the data structure of teacher data $D_c$ is shown in Expression (1).

{Formula 1}

$$D_c = [\text{label}_1, \text{bitmap}_1, \text{label}_2, \text{bitmap}_2, \ldots, \text{label}_n, \text{bitmap}_n] \quad (1)$$

Here, $\text{label}_i$ is a label string of an item of image content indicated by an i-th image, and $\text{bitmap}_i$ is bitmap data of the i-th image. That is, in the present invention, teacher data is a set of pairs of images and labels thereof. To solve a multiclass classification problem through deep learning, learning can be performed by linking a plurality of labels with one bitmap image, and labels and bitmap are defined as the relationship n×m. Next, $L_c$, which is the set of all labels defined by $D_c$, can be defined as follows:

{Formula 2}

$$L_c = [\text{label}_1, \text{label}_2, \ldots, \text{label}_p] \quad (2)$$

Here, $\text{label}_i$ is an i-th label string and has distinctiveness unique in the set $L_c$, and p corresponds to the number of kinds of labels specified by Dc. A production scenario $S_c$ corresponding to a character c can be defined as follows:

{Formula 3}

$$S_c = [\text{label}_1, \text{script}_1, \text{label}_2, \text{script}_2, \ldots, \text{label}_q, \text{script}_q] \quad (3)$$

Here, $\text{label}_i$ is the i-th kind of a label string, and $\text{script}_i$ is script data for production to be reproduced by the system when the i-th label is input. Note that, in the present invention, instead of using only one label, an item of image content may also be written by combining a plurality of labels, for example, as in the case where an apple and sunglasses are captured at the same time. Therefore, the maximum value q for the number of labels may be greater than the number p of kinds of labels, here.

Next, a method for generating a neural network model individualized for each character is shown. The learn function, which is a function for performing learning using DNN, is a function that receives teacher-data learning-data bucket $D_c$ corresponding to the certain character c and that outputs a model $M_c$ for performing multiclass classification for image content, and can be defined as follows:

{Formula 4}

$$\text{learn}(D_c) \rightarrow M_c \quad (4)$$

This learn function can be implemented as a generally-known method for generating an image-recognition NN model or as a method for inputting training data as fine tuning for a learned model. For example, AlexNet or VGG1 can be used as a method for generating an image-recognition NN model, and Inception-v3 can be used as a method for inputting training data as fine tuning for a learned model. These methods are well known to a person skilled in the art, as described in, for example, Krizhevsky, Alex, Ilya Sutskever, and Geoffrey E. Hinton. "Imagenet classification with deep convolutional neural networks." Advances in neural information processing systems. 2012, Lecun, Y, Bengio, Y & Hinton, G, "Deep learning," Nature, vol. 521, no. 7553, pp. 436-444. 2015, Toru Ogawa, Atsushi Otsubo, Rei Narita, Yusuke Matsui, Toshihiko Yamasaki, Kiyoharu Aizawa, "Object Detection for Comics using Manga109 Annotations," arXiv:1803.08670, 2018, Szegedy, C., Vanhoucke, V., Ioffe, S., Shlens, J., & Wojna, Z. (2016), and, Rethinking the Inception Architecture for Computer Vision. 2016 IEEE Conference on Computer Vision and Pattern Recognition (CVPR), 2818-2826.

In this way, an item of learning content individualized for each character is prepared, and an individualized neural network model is prepared, thereby making it possible to decide an item of image content to be identified, in accordance with the personality of the character. For example, in the case where a character A likes apples and cars, and a character B dislikes spiders and frogs in settings in a game scenario, images including an apple and a car as items of image content are prepared as teacher data for the character A, and images including a spider and a frog as items of image content are prepared as teacher data for the character B. Then, image recognition models for the characters A and B are respectively generated by using these. Accordingly, when image information is input to the image recognition model for the character A, the apple and the car are identified, and, when image information is input to the image recognition model for the character B, the spider and the frog are identified, whereby the items of image content decided uniquely to the characters can be identified. Then, an individualized scenario script can be executed according to the identified items of image content.

There are known general image recognition models using neural network models, and it is possible to solve an advanced labeling problem in which objects in images, such as cars, buses, handbags, and humans, are labelled with general nouns. Such general image recognition models can be used in autonomous driving and advanced surveillance cameras. Although general image recognition is an excellent technology, it is difficult to perform customization that is specialized for the applications, e.g., to finely classify label targets in accordance with game content or to react only to specific signboards, and it is necessary to prepare an extremely large volume of data in order to prepare a large number of learning models corresponding to a large number of applications, with existing methods, whereby there is a problem in terms of scalability for various kinds of practical use. Furthermore, because a large number of general objects are recognized, it is not always easy to cause an electronic device, such as a user terminal, to respond at high speed, and it is difficult to modify and extend the image recognition function merely by adding a small amount of data.

In contrast to this, as in this embodiment, since it is sufficient that a neural network model individualized for each character can identify only specific items of image content, it is easy to customize label targets in accordance with the character, and it is possible to implement a relatively small neural network model, whereby response performance during inference is high, and the image recognition function can be extended merely by adding a small amount of data.

Even in the case where a large number of characters exist in a game, only image recognition models for characters owned by the user are required to be downloaded to the electronic device 10, and, at the time of updating, only an updated image recognition model can be updated and downloaded.

Figure 5A:
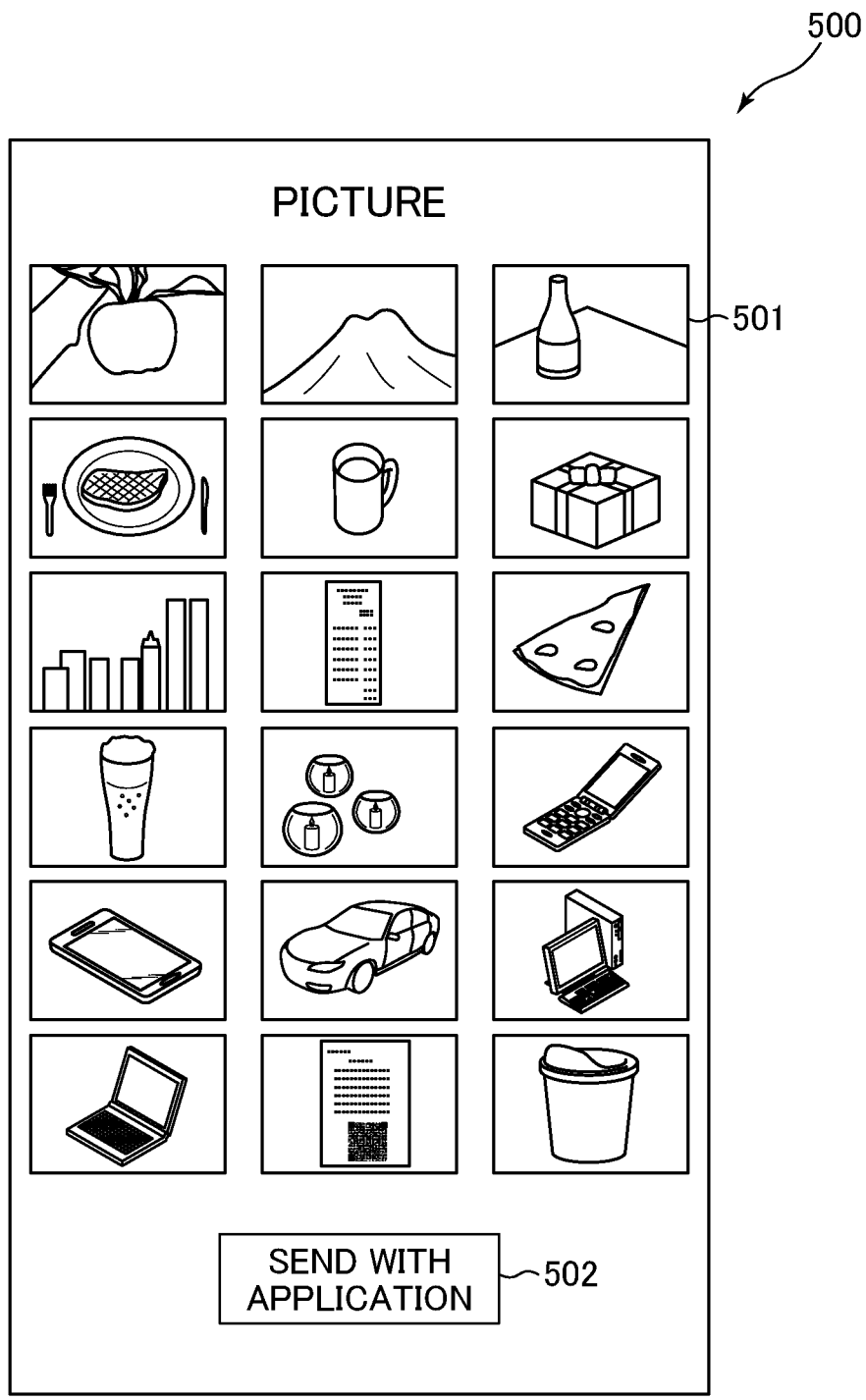
FIG. 5A is a view showing a screen display example according to the embodiment of the present invention.

At the electronic device 10, after the image recognition models for the characters owned by the user are stored, a screen 500 for specifying image information to be sent using an application is displayed on the display unit 102. Then, the image-information specifying unit 106 specifies image information serving as a transmission target on the basis of a user input operation accepted by the operation accepting unit 103 (S402). For example, as shown in FIG. 5A, a plurality of picture thumbnail images 501 are displayed on the screen, and the user touches a thumbnail image 501 of an image to be sent using an application and then touches a "send with application" button 502, whereby the image information serving as a transmission target is specified. It is also possible to specify two or more items of image information as image information to be sent.

Figure 5B:
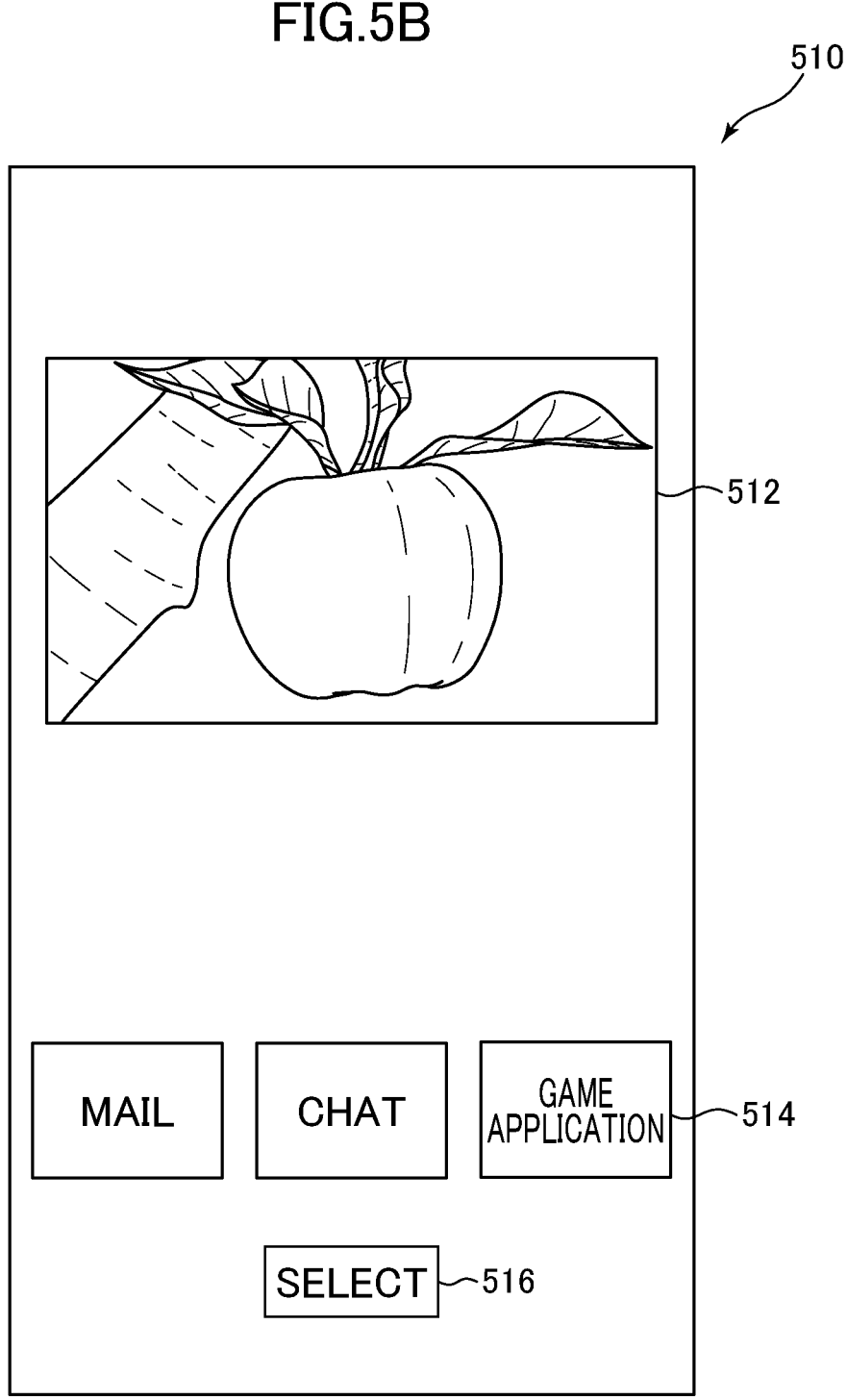
FIG. 5B is a view showing a screen display example according to the embodiment of the present invention.

Next, an application used to send the specified image information is identified according to a user operation. For example, as shown in FIG. 5B, an image 512 of the image information specified in S402 is displayed, icons 514 of applications available for being used for transmission are displayed, and the user touches one of the icons, thereby selecting corresponding one of the applications, and touches a "select" button 516, thereby selecting the application used for transmission. Here, it is assumed that the game application for carrying out the present invention is selected.

In this embodiment, although the processing for specifying image information and the processing for selecting an application used for transmission are executed as functions of the OS on the smartphone, they can also be executed as some functions of the game application of the present invention. For example, after the game application is activated, a function for sending image information to a character is activated, thereby making it possible to display the screen 500 for specifying image information.

Figure 5C:
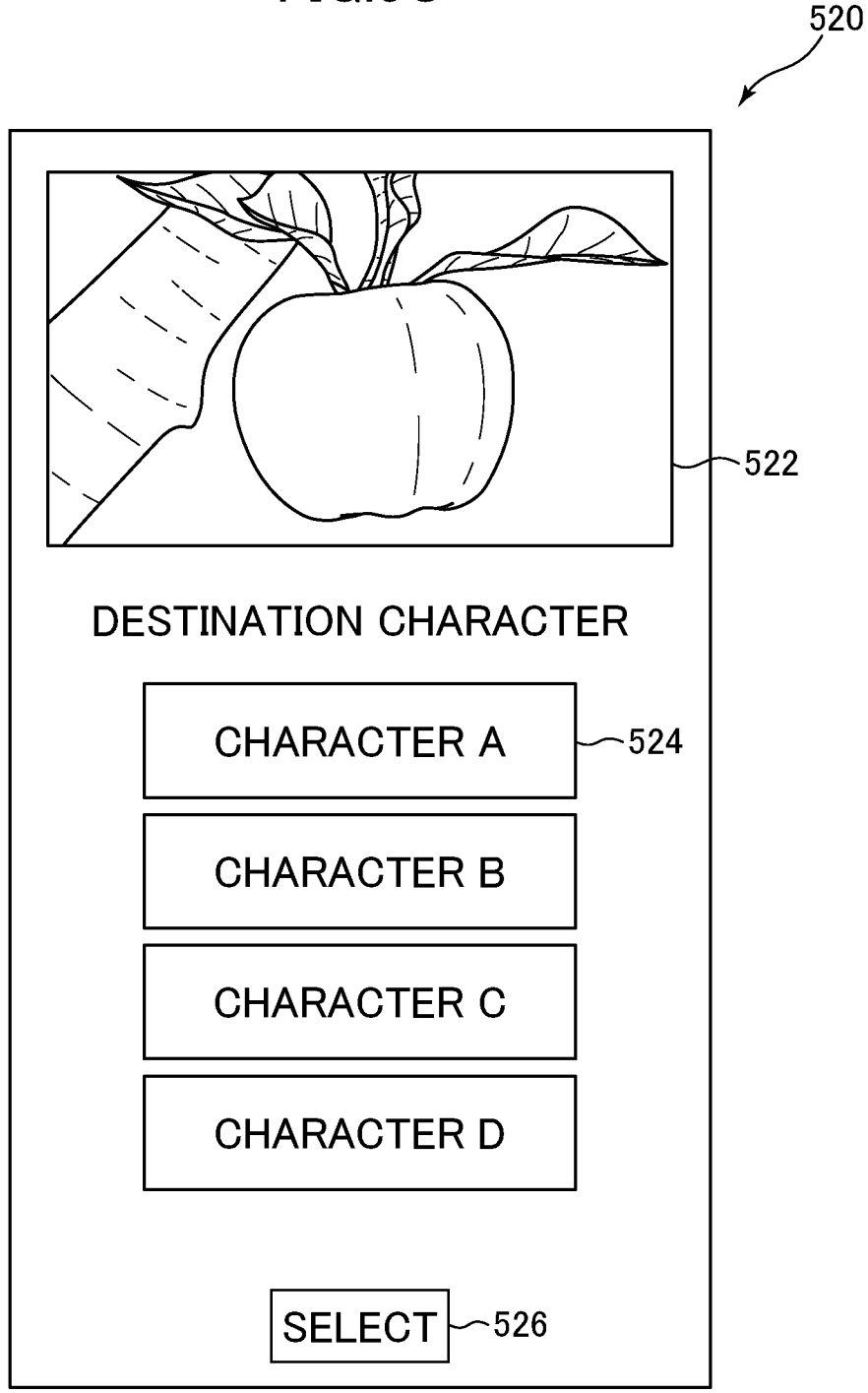
FIG. 5C is a view showing a screen display example according to the embodiment of the present invention.

When the user, who wants to send the image to a character, selects the game application for this embodiment as an application used for transmission, the game application is activated, and a screen for selecting character identifying information serving as destination attribute information is displayed on the display unit 102. Then, the destination-attribute-information identifying unit 107 identifies, as the destination of the image information, at least one item of character identifying information serving as attribute information, on the basis of a user operation accepted by the operation accepting unit (S404). For example, as shown in FIG. 5C, an image 522 specified as the transmission target is displayed, selection buttons for destination characters are displayed as buttons including text information 524 indicating character names, and the user touches one of the buttons, thereby selecting the corresponding character, and touches a select button 526, thereby identifying character identifying information serving as destination-attribute-information identifying information. In addition to text information indicating character names or instead of character names, it is also possible to display icon image information indicating characters. As long as character identifying information can be identified, another method, such as that using text information input by the user, can also be used.

Next, the image-recognition-model selecting unit 108 selects the image recognition model linked with the identified character identifying information, which is attribute information, from among the plurality of image recognition models 150-1 to 150-N stored in the storage unit 104 (S406).

The identifier-information inferring unit 109 inputs the image information specified by the image-information specifying unit 106 to the image recognition model selected by the image-recognition-model selecting unit 108, to infer identifier information from this image information on the basis of the learning content (S408).

For example, in the case where image information d and character identifying information c that serves as the destination are input, infer, which is the function for label inference, can be defined as follows:

{Formula 5}

$$\text{infer}(M_c, d) \rightarrow [\text{label\_score}_1, \text{label\_score}_2, \ldots, \text{label\_score}_p] \quad (5)$$

Here, $\text{label\_score}_i$ is a probability of existence of the item of image content corresponding to an i-th label in the bitmap. Then, in this embodiment, on the assumption that an item of image content corresponding to a label having the highest probability of existence exists, the identifier-information inferring unit 109 outputs, as inferred identifier information, the label serving as the identifier information of the item of image content. It is also possible to output a label group including all labels that have scores exceeding a predetermined threshold.

Since the image 522 input to the image recognition model includes, as an item of image content, an apple and no car, a high value is output as the $\text{label\_score}_1$, and a low value is output as the $\text{label\_score}_2$, whereby the $\text{label}_1$ corresponding to the apple is output as the inference result.

Then, on the basis of the identifier information output from the identifier-information inferring unit 109, the response-content executing unit 110 identifies the item of response content corresponding to this identifier information from among the plurality of items of response content stored in the storage unit 104 and executes the item of response content (S410).

Figure 5D:
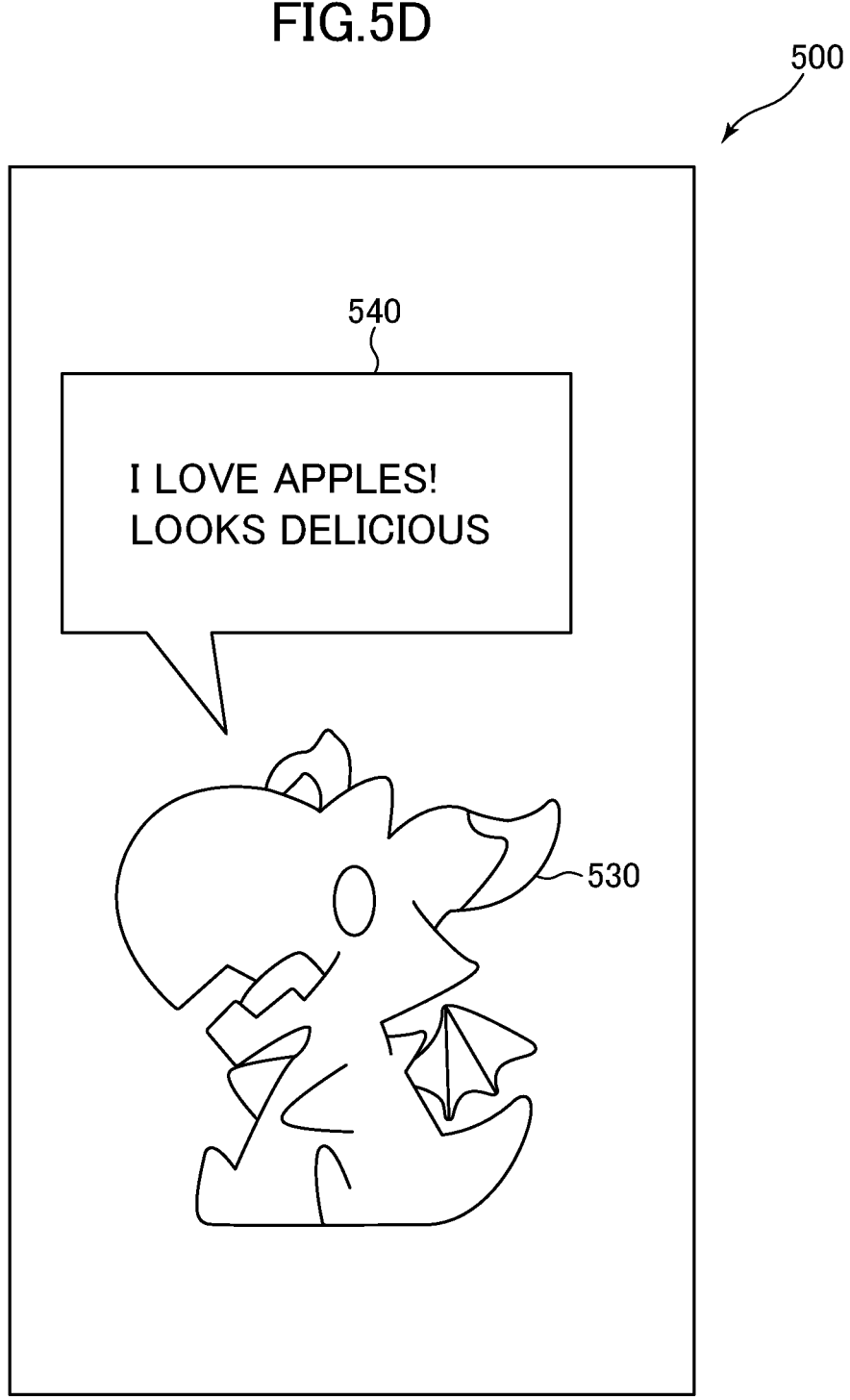
FIG. 5D is a view showing a screen display example according to the embodiment of the present invention.
Figure 6:
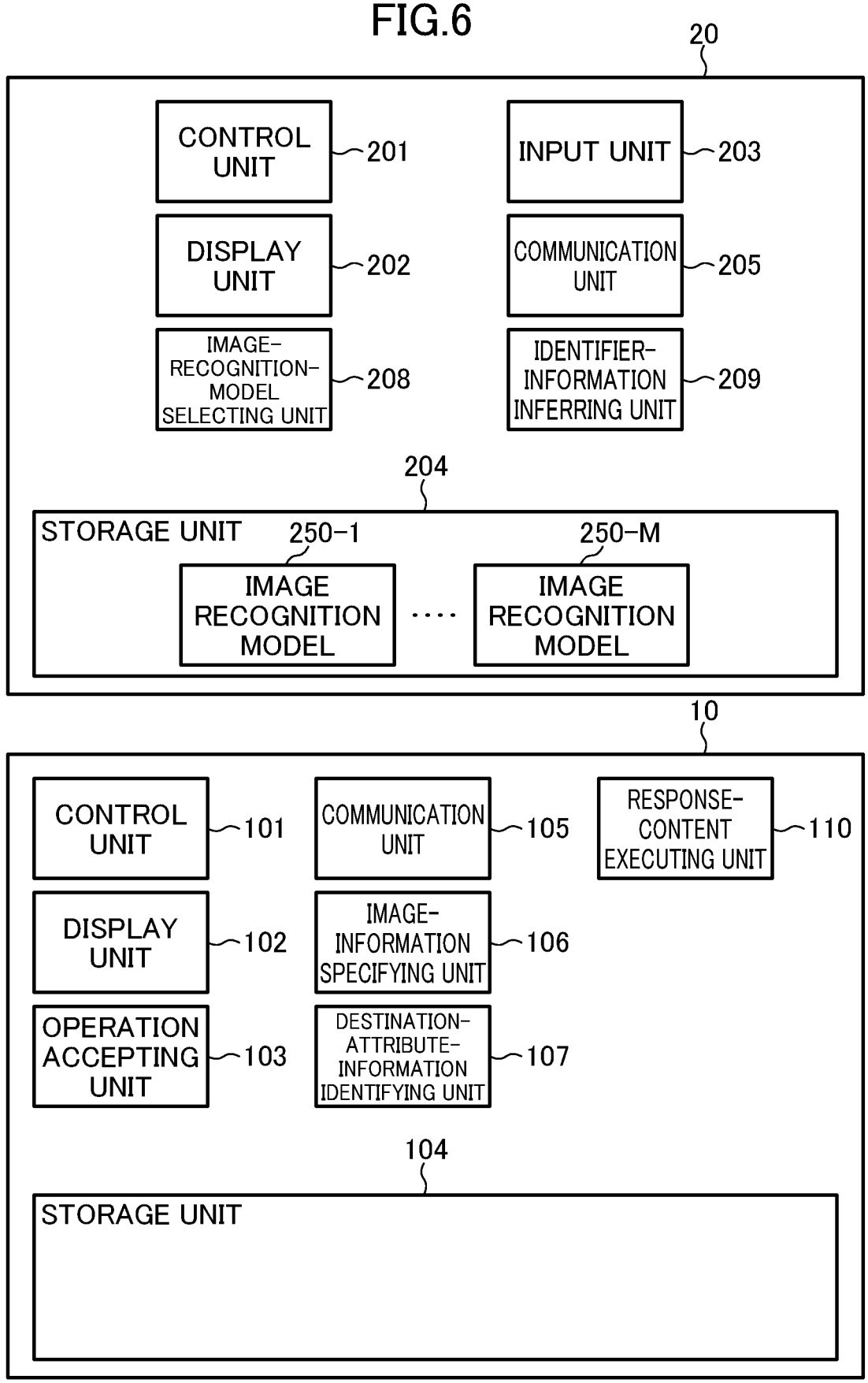
FIG. 6 is a functional block diagram of the server and the electronic device according to one embodiment of the present invention.

In this embodiment, the storage unit 104 stores a production scenario Sc so as to be linked with character identifier information, in the form of the data structure indicated by Expression (3). The response-content executing unit 110 identifies the character scenario Sc linked with the character identifying information identified by the destination-attribute-information identifying unit 107 and identifies, of the set of character scenarios, script data linked with the label serving as the identifier information inferred by the identifier-information inferring unit 109. Then, the response-content executing unit 110 executes the response content on the basis of the identified script data. For example, as shown in FIG. 5D, it is possible to display, on the display unit 102, an image 530 of the character corresponding to the character identifying information identified as the destination, and a message related to the apple, which is an item of image content of the input image, as a response message 540.

Conventional communication with a character in a game is limited to that in which the character is tapped, and then a response thereto is displayed. With use of this embodiment, for example, when the user sends an image acquired in the real world to a character, a reaction of the character to an item of image content thereof is produced, whereby natural communication becomes possible as if a picture or a moving image is shared with the character, and the sense of realness of the character can be enhanced. As a result, it is possible to increase the immersive feeling in the game and the sense of fusion with reality.

Image information to be sent in this embodiment does not depend on a particular camera device, and not only images acquired by cameras but also images distributed via the SNS account for the game application, images created in the form of collage by the user, etc., can be used as targets to be sent. Accordingly, it is possible to realize a production in which a character reacts to an image acquired at a real event and a production in which a character reacts to an image distributed via the SNS account.

An item of response content based on script data is not limited to a response based on a message and may be any type of response content as long as it responds to input image information. For example, it is also possible to play a moving image of a character or to start a battle event with the character. It is also possible to capture a poster posted at a real event venue and send an image thereof to attribute information, thereby starting processing for executing an event in a game.

As in this embodiment, a configuration is adopted such that items of attribute information and image recognition models are linked with each other, and, when an item of attribute information serving as a destination is selected, the image recognition model linked with the selected item of attribute information is selected and is used for image recognition; thus, even in the case in which, for example, hundreds or more characters recognize tens of thousands or more items of image content in a game application, it is possible to recognize a target item of image content through only one-time inference processing using image recognition models learned for the individual characters, whereby high response performance can be realized.

A learning model for recognizing an image can be made to have a size of hundreds of kilobytes, for example, and can be easily download to an electronic device while being linked with an item of attribute information in advance, whereby it is possible to execute image recognition processing at the electronic device. Thus, image information does not need to be sent to the server, whereby it is possible to properly protect personal information and to realize a reduction in the load on the server, at the same time. Furthermore, even in the case where an image recognition model is updated, the updated image recognition model just needs to be downloaded again to the electronic device, thus realizing high extensibility.

Second Embodiment

This embodiment differs from the first embodiment in that the electronic device 10 does not store image recognition models in the storage unit 104 and in that, instead of the image-recognition-model selecting unit 108 and the identifier-information inferring unit 109 of the electronic device 10, the server 20 includes an image-recognition-model selecting unit 208 and an identifier-information inferring unit 209. Differences from the first embodiment will be mainly described below.

In this embodiment, at the server 20, although items of learning content unique to individual characters are prepared, and image recognition models are defined by these items of learning content unique thereto and are stored in the storage unit 204 (S401), the image recognition models are not downloaded to the electronic device 10.

Then, through processing similar to that in the first embodiment, at the electronic device 10, image information to be sent to attribute information is specified (S402), and destination attribute information is identified (S404). Then, an identifier-information inference request including the specified image information and the identified destination attribute information is sent to the server 20 by using the communication unit 105. The image-recognition-model selecting unit 208 of the server 20 selects an image recognition model 250 to which the image information is input, on the basis of the destination attribute information included in the received identifier-information inference request (S406). The identifier-information inferring unit 209 inputs the image information included in the identifier-information inference request to the selected image recognition model 250 to execute identification-information inferring processing (S408). The identifier-information inferring unit 209 outputs identifier information corresponding to an item of image content of the image information, and the communication unit 205 of the server 20 sends the identifier information to the electronic device 10. The communication unit 105 of the electronic device 10 receives the identifier information sent from the server 20 and executes the response content on the basis of the script data linked with the identifier information (S410).

With use of this embodiment, the electronic device 10 does not need to store image recognition models and to execute the identifier-information inferring processing; thus, even in the case where the storage capacity or the processing capacity of the electronic device 10 is extremely small, the processing can be executed with high response performance.

Furthermore, instead of identifying script data corresponding to identifier information at the electronic device 10, the script data may be identified at the server 20, and the response content may be executed on the basis of the sent script data. Furthermore, for example, in the case of a browser-based game application, response processing may be executed at the server 20, and the executed production may just be displayed at the electronic device 10.

The processing or operation described above may be modified freely as long as no inconsistency arises in the processing or operation. Furthermore, the individual embodiments described above are merely examples for explaining the present invention, and the present invention is not limited to these embodiments. The present invention can be embodied in various forms without departing from the gist thereof. Furthermore, the advantageous effects described in the embodiments are merely the most preferable advantageous effects derived from the present invention, and the advantageous effects from the present invention are not limited to those described in the embodiments.

REFERENCE SIGNS LIST

- 1: system
- 2: network
- 10: electronic device
- 11: processor
- 12: display device
- 13: input device
- 14: storage device
- 15: communication device
- 16: bus
- 20: server
- 21: processor
- 22: display device
- 23: input device
- 24: storage device
- 25: communication device
- 26: bus
- 101: control unit
- 102: display unit
- 103: operation accepting unit
- 104: storage unit
- 105: communication unit
- 106: image-information specifying unit
- 107: destination-attribute-information identifying unit
- 108: image-recognition-model selecting unit
- 109: identifier-information inferring unit
- 110: response-content executing unit
- 150: image recognition model
- 201: control unit
- 202: display unit
- 203: operation accepting unit
- 204: storage unit
- 205: communication unit
- 208: image-recognition-model selecting unit
- 209: identifier-information inferring unit
- 250: image recognition model

The invention claimed is:

1. An electronic device comprising:
   a processor; and
   a memory connected to the processor, wherein the memory comprises a program that, when executed by the processor, is configured to perform a method comprising:
   accepting a user operation from a user within a game application;
   storing a plurality of image recognition models comprising a first image recognition model that is defined by an item of learning content,
   wherein the first image recognition model can infer identifier information using the item of learning content, and
   wherein the first image recognition model is linked with a game character that is operated within the game application;
   identifying at least one item of attribute information among a plurality of items of attribute information as a destination of image information based on the user operation;
   selecting, from among the plurality of image recognition models, the first image recognition model linked with the game character and based on the destination of image information;
   inputting image information for the game character to the first image recognition model to produce inferred identifier information based on the item of learning content;
   determining inferred game content based on the inferred identifier information; and
   executing a computer game based on the game character, the inferred game content, and the game application.

2. The electronic device according to claim 1, wherein a plurality of items of learning content define the plurality of image recognition models, wherein the plurality of items of learning content are each defined by an item of teacher data unique to a corresponding image recognition model among the plurality of image recognition models, and wherein the item of teacher data is defined by a set of pairs of items of image information and labels serving as items of identification information.

3. The electronic device according to claim 1, wherein the method further comprises:
   storing a plurality of items of response content respectively corresponding to a plurality of items of identifier information, so as to link the plurality of items of response content with the plurality of image recognition models,
   identifying, based on the item of identifier information, an item of response content corresponding to the item of identifier information from among the plurality of items of response content, and
   executing the item of response content.

4. The electronic device according to claim 1, wherein the method further comprises:
- displaying, on a display unit, information to the user,
- storing at least one of text information and icon image information that correspond to each of the plurality of items of attribute information,
- displaying, on the display unit, said at least one of the text information and the icon image information, and
- identifying at least one item of the plurality of items of attribute information as the destination of the image information in response to the user specifying a display at least one of the text information and the icon image information.

5. A method executed by at least one computer, the method comprising:
- accepting a user operation from a user within a game application;
- storing a plurality of image recognition models comprising a first image recognition model that is defined by an item of learning content,
  - wherein the first image recognition model can infer identifier information using the item of learning content, and
  - wherein the first image recognition model is linked with a game character that is operated within the game application;
- identifying at least one item of attribute information among a plurality of items of attribute information as a destination of image information based on the user operation;
- selecting, from among the plurality of image recognition models, the first image recognition model linked with the game character and based on the destination of image information;
- inputting image information for the game character to the first image recognition model to produce inferred identifier information based on the item of learning content;
- determining inferred game content based on the inferred identifier information; and
- executing a computer game based on the game character, the inferred game content, and the game application.

6. The method according to claim 5, wherein the at least one computer is a user terminal.

7. The method according to claim 5, wherein the at least one computer comprises a user terminal and a server.

8. A non-transitory computer readable medium storing a program configured to cause the at least one computer to execute the method according to claim 1.

9. A system comprising:
- a user terminal; and
- a server,
- wherein the user terminal is configured to perform a first method comprising:
  - accepting a user operation from a user within a game application; and
  - identifying at least one item of attribute information among a plurality of items of attribute information as a destination of image information based on the user operation;
- wherein the server is configured to perform a second method comprising:
  - storing a plurality of image recognition models comprising a first image recognition model that is defined by an item of learning content,
    - wherein the first image recognition model can infer identifier information using the item of learning content, and
    - wherein the first image recognition model is linked with a game character that is operated within the game application;
  - selecting, from among the plurality of image recognition models, the first image recognition model linked with the game character and based on the destination of image information;
  - inputting image information for the game character to the first image recognition model to produce inferred identifier information based on the item of learning content;
  - determining inferred game content based on the inferred identifier information; and
  - executing a computer game based on the game character, the inferred game content, and the game application.

* * * * *